(12) United States Patent
Luke et al.

(10) Patent No.: US 7,805,632 B1
(45) Date of Patent: Sep. 28, 2010

(54) STORAGE SYSTEM AND METHOD FOR RAPIDLY RECOVERING FROM A SYSTEM FAILURE

(75) Inventors: Stanley Luke, Stow, MA (US); Randall Smith, Arlington, MA (US)

(73) Assignee: Net App, Inc., Sunnyvale, CA (US)

( * ) Notice: Subject to any disclaimer, the term of this patent is extended or adjusted under 35 U.S.C. 154(b) by 370 days.

(21) Appl. No.: 11/860,191

(22) Filed: Sep. 24, 2007

(51) Int. Cl.
G06F 11/00 (2006.01)

(52) U.S. Cl. ................ 714/6; 714/5; 714/8; 714/36

(58) Field of Classification Search ............ 714/5, 714/6, 8, 36
See application file for complete search history.

(56) References Cited

U.S. PATENT DOCUMENTS

| | | | | |
|---|---|---|---|---|
| 5,086,502 | A * | 2/1992 | Malcolm ................. | 714/8 |
| 5,379,412 | A * | 1/1995 | Eastridge et al. .......... | 711/162 |
| 5,481,694 | A * | 1/1996 | Chao et al. .............. | 711/112 |
| 6,249,879 | B1 * | 6/2001 | Walker et al. ............ | 714/11 |
| 6,578,160 | B1 * | 6/2003 | MacHardy et al. ........ | 714/43 |
| 6,636,941 | B1 * | 10/2003 | Gold et al. .............. | 711/112 |
| 6,643,795 | B1 * | 11/2003 | Sicola et al. ............. | 714/6 |
| 6,658,590 | B1 * | 12/2003 | Sicola et al. ............. | 714/6 |
| 6,668,304 | B1 * | 12/2003 | Satran et al. ............. | 711/112 |
| 6,732,124 | B1 * | 5/2004 | Koseki et al. ............. | 707/202 |
| 6,820,098 | B1 * | 11/2004 | Ganesh et al. ............ | 707/202 |
| 6,877,111 | B2 * | 4/2005 | Sharma et al. ............ | 714/13 |
| 6,983,295 | B1 * | 1/2006 | Hart .................... | 707/204 |
| 7,039,661 | B1 * | 5/2006 | Ranade .................. | 707/204 |
| 7,082,446 | B1 * | 7/2006 | Bottomley ............... | 707/204 |
| 7,111,189 | B1 * | 9/2006 | Sicola et al. ............. | 714/6 |
| 7,203,796 | B1 * | 4/2007 | Muppalaneni et al. ...... | 711/114 |
| 7,219,260 | B1 * | 5/2007 | de Forest et al. .......... | 714/15 |
| 7,275,177 | B2 * | 9/2007 | Armangau et al. ......... | 714/5 |
| 7,376,866 | B1 * | 5/2008 | Sarma ................... | 714/16 |
| 7,415,488 | B1 * | 8/2008 | Muth et al. .............. | 707/202 |
| 7,487,386 | B2 * | 2/2009 | Everhart et al. .......... | 714/6 |
| 7,536,587 | B2 * | 5/2009 | Vertes ................... | 714/6 |
| 7,606,841 | B1 * | 10/2009 | Ranade .................. | 707/203 |
| 7,613,947 | B1 * | 11/2009 | Coatney et al. ........... | 714/6 |
| 2003/0028738 | A1 * | 2/2003 | Iyengar et al. ............ | 711/170 |
| 2003/0135782 | A1 * | 7/2003 | Matsunami et al. ........ | 714/5 |
| 2003/0188218 | A1 * | 10/2003 | Lubbers et al. ........... | 714/5 |
| 2004/0098425 | A1 * | 5/2004 | Wiss et al. .............. | 707/204 |
| 2004/0267809 | A1 * | 12/2004 | East et al. ............... | 707/104.1 |
| 2005/0216462 | A1 * | 9/2005 | Xiao .................... | 707/8 |
| 2006/0179211 | A1 * | 8/2006 | Aasheim et al. .......... | 711/103 |
| 2006/0200501 | A1 * | 9/2006 | Holenstein et al. ........ | 707/202 |
| 2006/0235909 | A1 * | 10/2006 | Oks et al. ............... | 707/204 |
| 2006/0253731 | A1 * | 11/2006 | Petruzzo ................ | 714/6 |
| 2007/0033324 | A1 * | 2/2007 | Sinclair ................. | 711/103 |
| 2007/0136380 | A1 * | 6/2007 | Kulesza et al. ........... | 707/200 |

(Continued)

*Primary Examiner*—Robert Beausoilel
*Assistant Examiner*—Joshua P Lottich
(74) *Attorney, Agent, or Firm*—Cooper Legal Group, LLP (57) ABSTRACT

A method and apparatus for delaying the process of freeing data blocks during the processing of a non-volatile transactions log are disclosed. Accordingly, after a system failure, when a storage system is replaying transactions in a non-volatile transactions log, the storage system flushes the data generated from the transactions to disk storage without freeing and data blocks which, as a result of processing the transactions log, are no longer storing data that is part of the active file system. Consequently, the replay of the transactions log takes less time, and the storage system is brought online more quickly.

22 Claims, 6 Drawing Sheets

U.S. PATENT DOCUMENTS

| | | | |
|---|---|---|---|
| 2007/0168692 A1* | 7/2007 | Quintiliano | 714/4 |
| 2007/0180302 A1* | 8/2007 | Allen et al. | 714/6 |
| 2007/0185924 A1* | 8/2007 | Kawamura | 707/202 |
| 2007/0220059 A1* | 9/2007 | Lu et al. | 707/200 |
| 2008/0034251 A1* | 2/2008 | Singhal et al. | 714/5 |
| 2008/0077590 A1* | 3/2008 | Pandit | 707/8 |
| 2008/0270776 A1* | 10/2008 | Totolos et al. | 713/1 |
| 2008/0270825 A1* | 10/2008 | Goodson et al. | 714/6 |
| 2008/0313293 A1* | 12/2008 | Jacobs et al. | 709/206 |
| 2009/0006888 A1* | 1/2009 | Bernhard et al. | 714/6 |
| 2009/0106328 A1* | 4/2009 | Callaway et al. | 707/202 |

* cited by examiner

STORAGE SYSTEM AND METHOD FOR RAPIDLY RECOVERING FROM A SYSTEM FAILURE

FIELD OF THE INVENTION

The invention generally relates to data storage systems. More specifically, the invention relates to a method and apparatus for limiting the time after a system failure event for which a storage system is unable to process client-initiated requests.

BACKGROUND

Some storage systems utilize a transactions log in a non-volatile memory device to record a log of client transactions that have been processed by the storage system, but not yet committed to disk storage. For instance, a client-initiated request to write data to a file may be processed by a storage system by writing the data to a block data cache in system memory and recording the client-initiated write request in the transactions log. Accordingly, if the storage system encounters a system failure event before the storage system "flushes" (e.g., writes) to disk storage that portion of the active file system stored in the cache, the transactions log can be processed to recover any active file system data that may have been in system memory—and therefore lost—during the system failure event. In this context, "active file system data" is simply the most current file system data. For example, if a client-initiated write command results in new data modifying or replacing old data, the new data is the active file system data.

Processing the transactions log in this manner is often referred to as "replaying" the transactions log. This replay process generally occurs during file system initialization in one of two contexts. In a stand-alone storage system, the replay process occurs during the first boot-up of the storage system after a system failure event. For instance, during the first boot-up after a system failure event, the storage system processes the transactions recorded in the transactions log to condition the state of the block data cache in system memory as it was when the system failure event occurred. Next, the storage system flushes the data contents of the block data cache to disk storage, thereby creating a consistency point for the active file system. Accordingly, any data in the system memory (e.g., block data cache) that may have been lost, during the system failure event are recovered by replaying the appropriate transactions recorded in the transactions log, and flushing the resulting data to disk storage.

In the context of a high-availability clustered configuration (sometimes referred to as a failover duster), where two storage systems are configured such that one storage system will take over and process client requests on behalf of another storage system in the event one system fails, the replay process occurs during a failover or takeover procedure. For instance, after a system failure event at one storage system the surviving storage system replays the transactions in the transactions log of the failed storage system (or a transactions log mirror) to generate any active file system data that may have been in the block data cache in system memory of the failed storage system—and therefore lost—at the time of the system failure event. The data generated by replaying the transactions in the failed storage system's transactions log are written into the surviving storage system's system memory, and then flushed to the failed storage system's disk storage as part of the takeover procedure. Once the active file system data of the failed storage system has been flushed to disk storage, the surviving storage system begins processing client-initiated requests on behalf of the failed storage system.

Whether the replay process is part of a recovery process in a stand-alone configuration or part of a takeover process in a high-availability clustered configuration, the replay process is perceived as "down time" by client applications. That is, the storage system is non-responsive to client-initiated requests during the replay process. This is problematic as many clients do not expect, or cannot properly handle, delays and/or timeouts in the servicing of requests directed to highly reliable storage systems. For example, some client applications, such as stock exchange trading or quotation applications, are extremely time sensitive and require low latency for data storage operations. Other client applications may fail or malfunction in some manner if a client request is not serviced due to the replay process taking too long to complete.

One reason the replay process may take a long time to complete is due to the number and nature of disk read and disk write operations that must be processed during the transactions log replay procedure. Generally, the inure disk read and disk write operations that must be processed during the transactions log, replay procedure, the longer it will take for the file system to be initialized and the storage system to begin processing client-initiated commands.

Although both disk read and disk write operations can delay the completion of the transactions log replay procedure, the delay due to disk read operations is often more significant with certain data storage systems. For instance, because the replay procedure occurs after a system failure event, those data storage systems that implement block data caches will likely perform a significant number of disk read operations because the contents of system memory (and therefore the cache) are essentially empty. For instance, that portion of system memory dedicated for use as a data block cache does not contain any file system data a situation commonly referred to as a cold cache. Accordingly, during a recovery or takeover procedure after a system failure, nearly all read operations will result in data being read from disk. Due to the seek time required by the reading component of the storage device (e.g., disk drive head) to search for and locate individual disk blocks, disk read operations can be particularly costly in terms of time.

Furthermore, some data storage systems implement file systems based on a copy-on-write, transactional object model. For example, storage systems from Network Appliance® of Sunnyvale, Calif. generally implement a file system known as WAFL®, which uses a copy-on-write, transactional object model. With such systems, blocks containing active file system data are never overwritten in place; instead, a new block is allocated, modified data is written to it, and then any metadata blocks referencing it are similarly read, reallocated, and written. To reduce the overhead of this process and improve overall efficiency, the data from multiple write commands are grouped together and written to disk at once. For example, data from several client-initiated write commands are first processed into system memory, thereby enabling the storage system to efficiently organize the data prior to writing the data to disk. As a consequence, the system overhead associated with allocating disk blocks and writing data to the newly allocated disk blocks is minimal. However, the process of freeing those disk blocks that are no longer storing active file system data (as a result of replaying, the transactions log) can delay completion of replaying the transactions log.

Generally, in order to free disk blocks, a data structure indicating the status of the blocks (e.g., allocated or free) must be read into system memory, modified, and then written back to disk. Consequently, with some storage systems, the operations required for freeing disk blocks during a transactions to replay results in multiple disk reads, where each block being read is in a different location on disk. Both the number and nature of the resulting disk reads can cause a significant delay in the completion of replaying a transactions log.

SUMMARY

According to one embodiment of the invention, a stand-alone storage system performs a method to recover from a system failure event. During a file system initialization process, which occurs during the first boot-up sequence after the storage system experienced the system failure event, the storage system processes a non-volatile transactions log by "replaying" client transactions stored in the transactions log. By replaying the transactions in the transactions log, active file system data that were lost during the system failure event are recovered and written to system memory. Next, the storage system allocates data blocks of a storage device (e.g., a disk drive), and then writes the active file system data to the newly allocated data blocks without freeing any data blocks of the storage device, which, as a result of processing a client-initiated transaction stored in the non-volatile transactions log, are no longer storing data that are part of the active file system. Once the active file system data have been flushed from system memory to a storage device, the storage system resumes processing client-initiated transactions. Only after the storage system has begun processing client-initiated transactions are those blocks no longer storing data that are part of the active file system freed. Furthermore, the procedure for freeing those blocks is optimized so as to limit the number of disk read operations required.

In another embodiment of the invention, a surviving storage system performs a method to takeover for a failed storage system after a system failure event. Accordingly, after the system failure occurs, the surviving storage system performs a file system initialization process to prepare itself for processing client requests on behalf of the failed storage system. As part of the file system initialization process, the storage system processes client-initiated transactions stored in a non-volatile transactions log of the failed storage system. The transactions log may be a transactions log mirror, where transactions previously processed by the failed storage system have been mirrored from the failed storage system to the surviving storage system. In any case, processing the transactions log causes active file system data to be written to the system memory of the surviving storage system. This active file system data represents data that may otherwise have been lost when the failed storage system encountered the system failure event. After, or during, the processing of the transactions log, the surviving storage system allocates data blocks of a storage device associated with the failed storage system, and then flushes (e.g., writes) the active file system data to the newly allocated data blocks without freeing any data blocks which, as a result of processing a transaction in the transactions log, are no longer storing data that are part of the active file system. After flushing the active file system data to the newly allocated blocks, the storage system begins processing client-initiated transactions on behalf of the failed storage system Only after the surviving storage system has begun processing client-initiated transactions on behalf of the failed storage system does the surviving storage system free those blocks which, as a result of processing a transaction in the transactions log, are no longer storing data that are part of the active file system.

Other aspects of the invention will become apparent from the description that follows.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DESCRIPTION

Consistent with one embodiment of the invention, during the first hoot-up sequence after a storage system has experienced a system failure event, the storage system performs a file system initialization process. The file system initialization process involves replaying client-initiated transactions, which were recorded in a non-volatile transactions log prior to the system failure event. By replaying the transactions in the transactions log, any data that were stored in system memory at the time of the system failure event—and therefore lost during the system failure event—are recovered. To decrease the time required to replay the transactions log and initialize the storage system, the storage system temporarily refrains from freeing any disk blocks as it replays the transactions log. Specifically, the storage system temporarily refrains from freeing disk blocks which—as a result of processing a transaction in the transactions log—are no longer storing data that are part of the active file system. Only after the file system has been initialized and the storage system has begun processing client-initiated requests does the storage system free those disk blocks which are no longer storing active file system data.

in another embodiment of the invention, two storage systems are configured such that one storage system will take over and process client requests on behalf of another storage system in the event one system fails. Accordingly, after one storage system experiences a system failure event, the surviving storage system performs a file system initialization process in connection with a failover procedure so as to prepare the surviving storage system to service clients on behalf of the failed storage system. As part of the file system initialization process, the surviving storage system replays a transactions log associated with the the failed storage system. Accordingly, any file system data that were stored in the memory of the failed storage system at the time of the failure event are recovered by replaying the transactions log. To decrease the time required to process the transactions log, the surviving storage system temporarily refrains from freeing any disk blocks, which—as a result of processing a transaction from the transactions log are no longer storing active file system data. Consequently, all of the disk read and disk write operations associated with an operation to free a disk block are delayed until after the storage system has been initialized and has begun processing client-initiated requests. This shortens the time required to initialize the file system, where such time is perceived as down time by clients trying to access data on the storage system.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Figure 1:
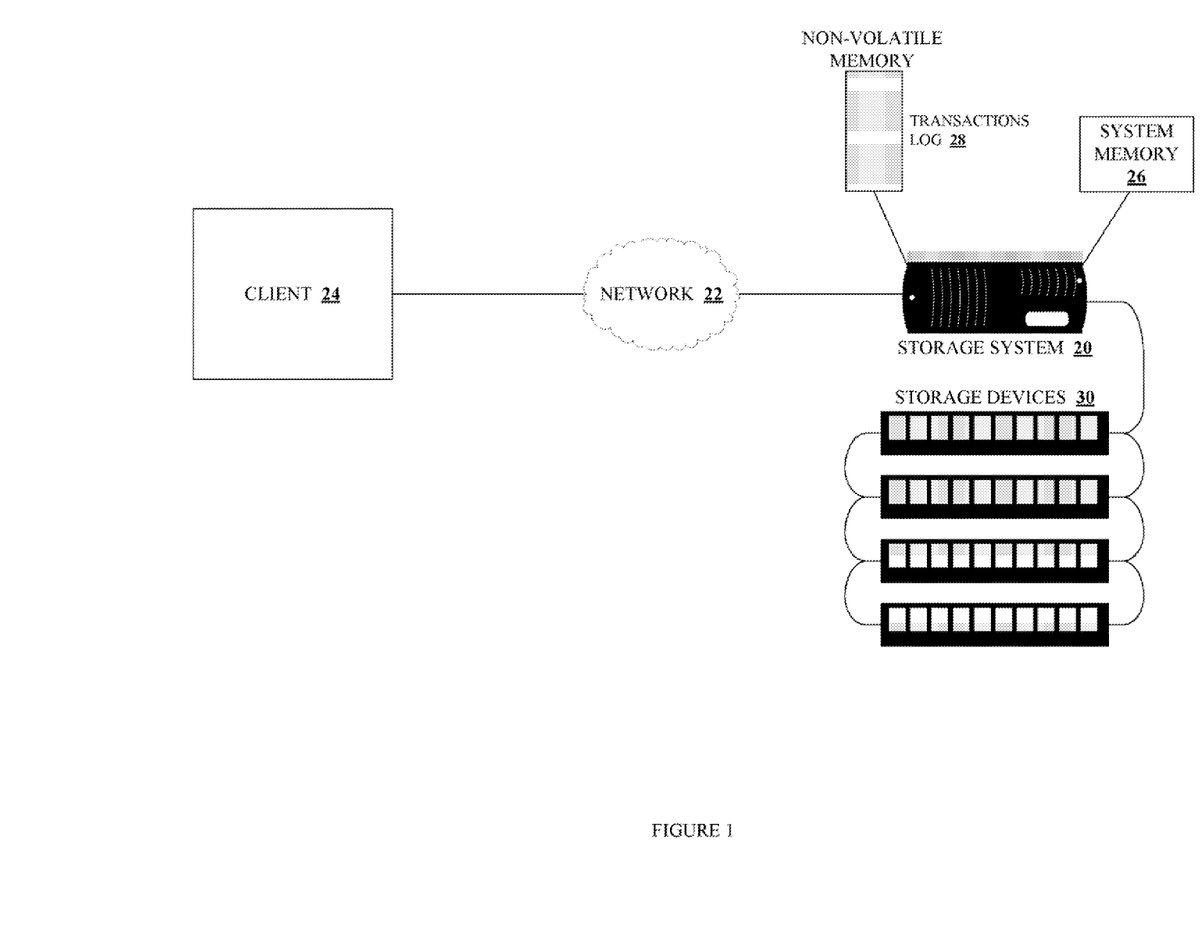
FIG. 1 illustrates a stand-alone storage system configured to provide a data storage service to clients over a network, according to an embodiment of the invention.

FIG. 1 illustrates a stand-alone storage system 20 configured to provide a data storage service to clients over a network 22, according to an embodiment of the invention. The storage system 20 provides a high-availability data storage service to one or more clients, such as client 24, over a network 22. As illustrated in FIG. 1, the storage system 20 includes a system memory 26 and a non-volatile memory with a transactions log 28. In addition, the storage system 20 is connected to a group of storage devices 30 (e.g., disk drives or disk shelves).

During normal operation, when the storage system 20 receives a write request from the client 24, the storage system 20 logs a write transaction in the transactions log 28 and then writes the corresponding data to system memory 26 on behalf of the client 24. When the system memory 26 reaches a predetermined capacity, or the transactions log 28 reaches a predetermined capacity, or at some predetermined time interval, data previously written to system memory 26 are written to one or more storage devices 30. For example, one or more data blocks are allocated for the data, and then the data are written to the newly allocated data blocks. In addition, any data blocks that are no longer storing active file system data are freed, and the corresponding transactions are cleared from the transactions log 28, thereby freeing system memory 26 and the transactions log 28 for processing new read/write requests. If for any reason a system failure should occur prior to the storage system flushing data from system memory 26 to the storage devices 30, any data in system memory 26 that may be lost due to the system failure can be restored by processing the transactions in the transactions log 28 of the non-volatile memory.

Figure 2:
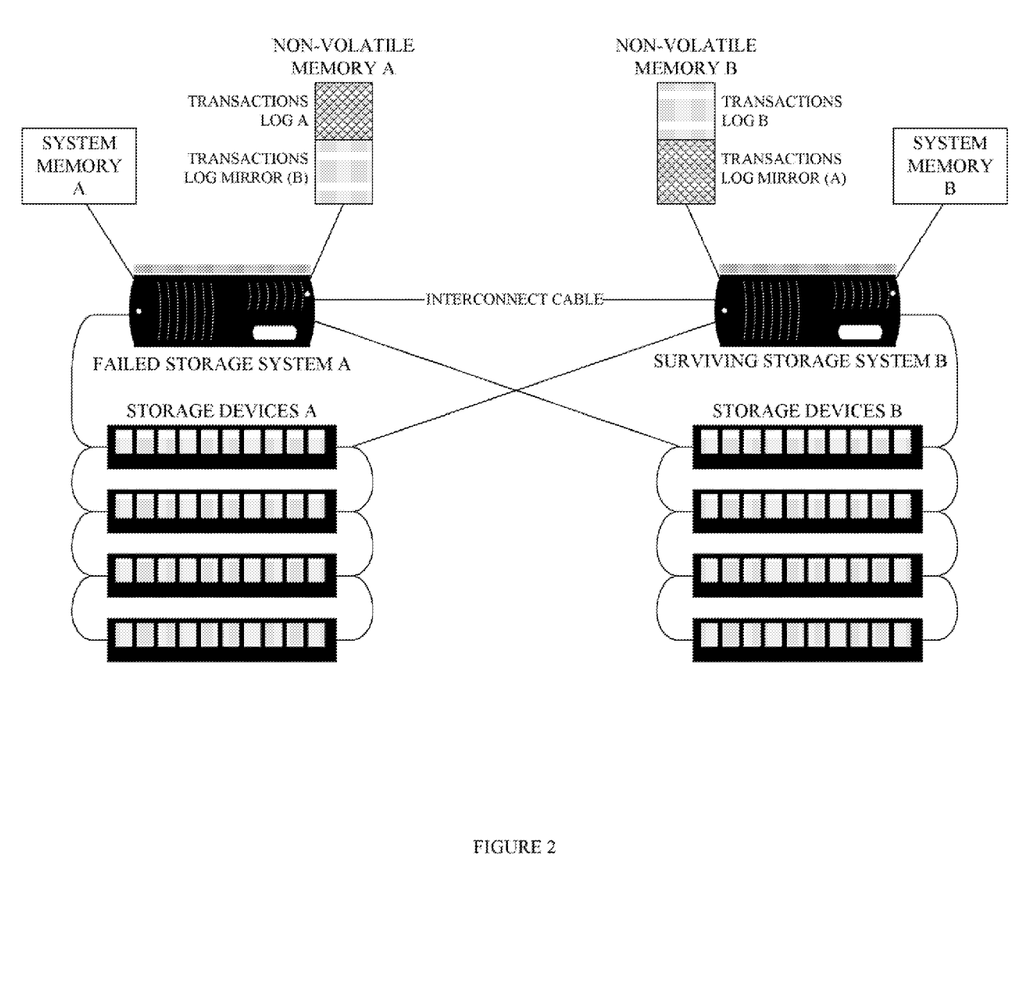
FIG. 2 illustrates an example of two data storage systems configured in a high-availability cluster such that either storage system can serve as a back-up system to the other in the event one system fails, according to an embodiment of the invention.

FIG. 2 illustrates an example of two data storage systems (e.g., storage system A and storage system B) configured in a high-availability cluster such that either storage system can serve as a back-up system to the other in the event one system fails. For instance, during normal operating mode, each data storage system A and B operates independently of the other. In normal operating mode, storage system A provides clients with access to storage devices A, and storage system B provides clients access to storage devices B. Storage system A is said to "own" storage devices A, while storage system B "owns" storage devices B. However, in the case that a system failure occurs at either storage system, a takeover procedure is initiated by the surviving storage system to ensure that clients can continue to access data stored on the data storage devices of the failed storage system. Accordingly, as illustrated in FIG. 2, storage system A is coupled not only to storage devices A, but also to storage devices B. Similarly, storage system B is coupled to both storage devices A and storage devices B. Furthermore, each of storage systems A and B includes an interconnect adapter (not shown) by which they are connected to one another via an interconnect cable.

Referring again to FIG. 2, each storage system is shown to include its own system memory e.g., system memory A and B). In addition, each storage system A and B has a non-volatile memory (e.g., non-volatile memory A and B) where a transactions log and log mirror are stored. For example, storage system A is shown to include non-volatile memory A, which is partitioned to include a first portion (e.g., transactions log A) for storing client transactions directed to storage system A, and a second portion (e.g., transactions log mirror (B)) for storing transactions directed to storage system B. When a client directs a write request to storage system A, a transaction is logged in transactions log A of non-volatile memory A, and the associated data is written to system memory A, where it is stored until a later time when the data is flushed to storage devices A. In addition, the transactions record is mirrored to transactions log mirror (A) of non-volatile memory B. This allows storage system B to replicate the state of storage system A's system memory (e.g., system memory A), if necessary, during a takeover process.

When a takeover procedure is performed, the storage system delays freeing data blocks when writing active file system data to disk as part of the replay process. For instance, while processing the transactions log and flushing active file system data to disk, those data blocks which, as a result of data generated during the replay process, are no longer storing data that is part of the active file system are not immediately freed, Instead, only after the surviving storage system has completed the replay process does the surviving storage system begin, freeing data blocks.

Figure 3:
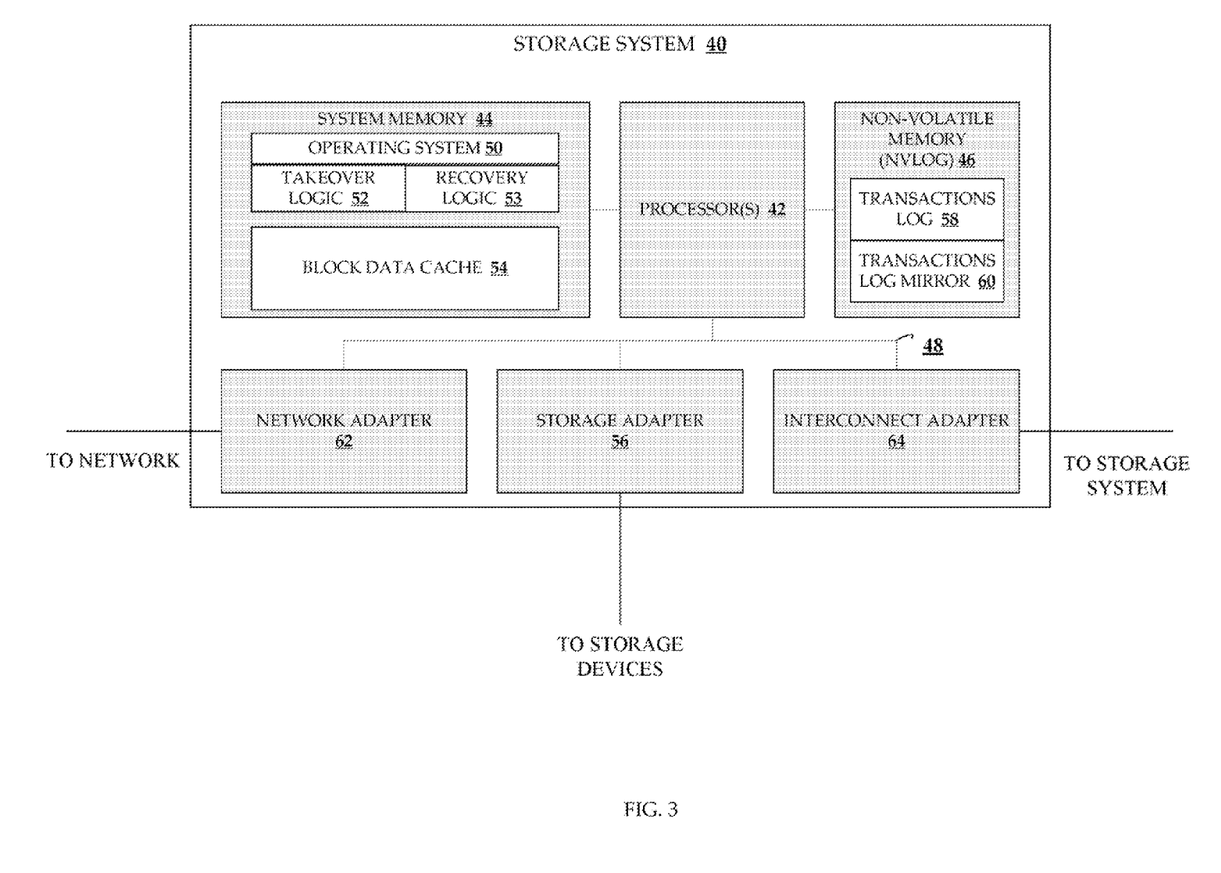
FIG. 3 illustrates a logical block, diagram of a storage system, according to an embodiment of the invention.

FIG. 3 illustrates a logical block diagram of a storage system 40, according to an embodiment of the invention. Certain standard and well-known components which are not necessary for understanding and/or implementing the present invention have been left out so as to avoid obscuring the invention in unnecessary detail. Although the storage system illustrated in FIG. 3 is meant to be representative of a typical storage system, in one particular embodiment of the invention, the storage system is consistent with storage systems (sometimes referred to as a "filers") designed by Network Appliance, Inc. of Sunnyvale, Calif.

As illustrated in FIG. 3, the storage system 40 includes one or more processors 42 coupled to system memory 44 as well as a non-volatile memory 46 by means of a bus system 48. The bus system 48 shown in FIG. 3 is an abstraction that represents any one or more separate physical buses and/or point-to-point connections, connected by appropriate bridges, adapters and/or controllers. The bus system 48, therefore, may include, for example, a system bus, a Peripheral Component Interconnect (PCI) bus, a HyperTransport or industry standard architecture (ISA) bus, a small computer system interface (SCSI) bus, a universal serial bus (USB) or an Institute of Electrical and Electronics Engineers (IEEE) standard 1394 bus (sometimes referred to as "Firewire").

The processor(s) 42 are the central processing units (CPUs) of the storage system 40 and, thus, execute instructions and control the overall operation of the storage system 42. In certain embodiments, the processor(s) 42 accomplish this by executing software instructions (e.g., applications or procedures) stored in system memory 44. The processor(s) 42 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The system memory 44 is or includes the main memory of the storage system 40. The system memory 44 represents any form of random access memory (RAM), read-only memory (ROM), flash memory, or the like, or a combination of such devices. The system memory 44 stores, among other things, the operating system 50 of the storage system 40, in which a transactions log replay process may be implemented. In addition, the system memory 44 temporarily stores client generated data in a block data cache 54 prior to writing the data to an appropriate storage device via the storage system's storage adapter 56. The system memory 44 is generally a volatile memory device, which loses its data contents when not provided with power.

In addition to the system memory 44, the storage system 40 includes a non-volatile memory 46. In contrast to the system memory 44, the non-volatile memory 46 maintains its data contents in the absence of power. Accordingly, the non-volatile memory 46 includes a transactions log 58 for storing client-initiated transactions that have been committed to the block data cache 54 of the system memory 44, but not yet flushed (e.g., written) to the appropriate storage device. In addition, the non-volatile memory 466 includes a transactions log mirror 60 for storing transactions that have been committed to the system memory of a partner storage system, but not yet committed to the storage devices of the partner storage system. Accordingly, if a failure event (e.g., a power failure) occurs at the storage system 40, the transactions log 58 of the non-volatile memory 46 can be used to recover any lost client data that was stored in the data cache 54 of the system memory 44 and not yet written to the appropriate storage devices at the time of the failure. Similarly, if the partner storage system fails, the storage system 40 can process the transactions in the transactions log mirror to recover any data that was lost in the system memory of the partner storage system during the failure event.

Also connected to the processor(s) 42 through the bus system 48 are one or more internal mass storage devices (not shown), a storage adapter 56, a network adapter 62 and an interconnect adapter 64. The internal mass storage device may be or include any conventional medium for storing large volumes of data in a non-volatile manner, such as one or more magnetic or optical based disks. The storage adapter 56 allows the storage system 40 to access the storage devices of the storage subsystem and may be, for example, a Fibre Channel adapter or a SCSI adapter. The network adapter 62 provides the storage system 40 with the ability to communicate with remote devices, such as clients, over a network and may be, for example, an Ethernet adapter.

When configured in a high-availability cluster to provide failover protection and operate in conjunction with a partner storage system, the interconnect adapter 64 of the storage system 40 is a mechanism by which the storage system 40 communicates directly with its partner storage system. For instance, transactions log data may be communicated (e.g., mirrored) to the partner storage system via the interconnect adapter 64. Similarly, each storage system in the cluster may communicate a heartbeat signal periodically to indicate to its partner that it is operating in a normal state. In an alternative embodiment of the invention, the network adapter 62 may serve as the mechanism by which two storage systems communicate with one another. For instance, each storage system may be configured to communicate (e.g., mirror) transactions to the other via the network adapter.

In one embodiment of the invention, the operating system 50 of the storage system is a version of the Data ONTAP® operating system available from Network Appliance of Sunnyvale, Calif. Accordingly, the storage system 40 may operate with a write anywhere file layout (WAFL®) file system such that the storage system 40 logically organizes data (e.g., files) into a hierarchical structure, and stores the data as blocks on disks, or some other like-kind storage device.

When configured to operate in a high-availability cluster, the storage system 40 includes takeover logic 52, as illustrated in FIG. 3. For example, when the storage system 40 is configured to take over for, and serve data on behalf of a failed partner storage system, the takeover logic 52 performs the necessary steps to initialize the surviving storage system so it can begin processing client-initiated requests on behalf of the failed storage system. As described in greater detail below, the takeover logic 52 implements or calls on a transactions log replay procedure. According to an embodiment of the invention, the transactions log replay procedure writes active file system data to a storage device without freeing any data blocks which, as a result of the replay procedure, are no longer part of the active file system.

Referring again to FIG. 3, when configured to operate as a stand-alone storage system, the storage system 40 includes recovery logic 53. The recovery logic 53 ensures that the storage system performs the necessary initialization steps after a system failure so that no data corruption occurs. In particular, the recovery logic 53 ensures that data, which may otherwise have been lost during the system failure, is recovered by replaying the transactions log and flushing the data to the storage devices before processing any client-initiated requests. Similar to the takeover logic 52 described above, the recovery logic 53 implements or utilizes a transactions log replay procedure that delays freeing data blocks until the surviving storage system has been initialized and begins processing client-initiated requests on behalf of the failed storage system.

Figure 4:
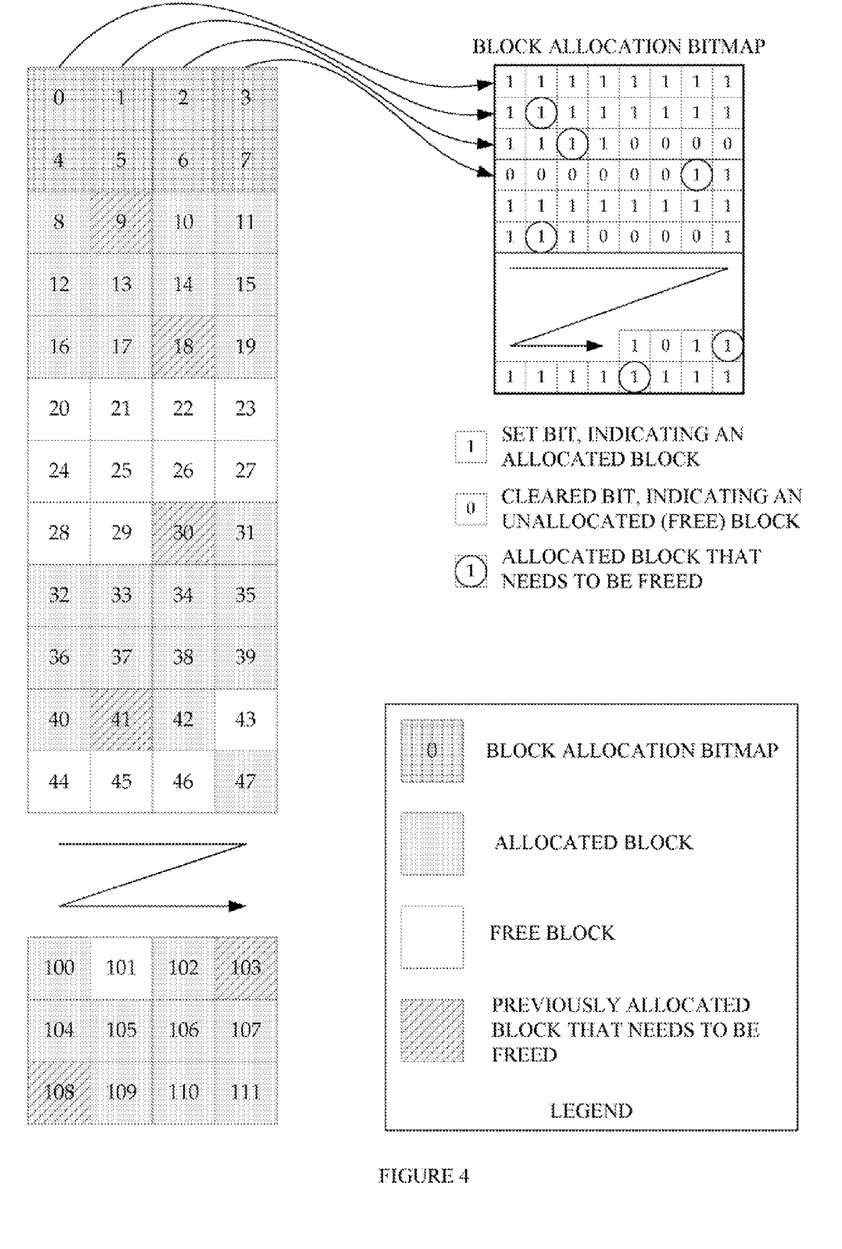
FIG. 4 illustrates an example of several disk blocks of a storage device immediately after a storage system has processed a group of write commands from a transactions log as part of a transactions log replay procedure.

FIG. 4 illustrates an example of several disk blocks immediately after a storage system has processed a group of write commands in a transactions log. The disk blocks numbered 9, 18, 30, 41, 103 and 108 are disk blocks that contain data that are no longer part of the active file system. For example, as a result of processing one or more write commands in the transactions log, the data in disk blocks 9, 18, 30, 41, 103 and 108 have become obsolete. Accordingly, disk blocks 9, 18, 30, 41, 103 and 108 need to be de-allocated, or freed, so that they may be reused by the storage system.

Generally, in order to free disk blocks, a data structure indicating the status of the blocks (e.g., allocated or free) must be read into system memory. Although a wide variety of data structures might be used in different file system implementations, the data structure that serves this purpose in FIG. 4 is a block allocation bitmap stored in disk blocks 0 through 7. In this somewhat simplified example, each disk block comprises eight bits, such that each block of the block allocation bitmap indicates the status (e.g., allocated or free) of eight disk blocks. For example, block 0 has eight bits that are set, indicating that disk blocks numbered 0 through 7 have been allocated. Similarly, block 1 has eight bits such that each bit indicates the status of one disk block of those disk blocks numbered 8 through 15, and so on. For example, the second bit of disk block one is circled, indicating that the disk block corresponding with that bit (e.g., disk block number 9) is a block that is currently allocated but needs to be freed.

Because the blocks to be freed are randomly scattered on disk and generally exhibit a low level of locality, if the blocks are freed serially as they become stale, it is unlikely that any one block of the block allocation bitmap will indicate the status of more than one disk block. For instance, as illustrated in FIG. 4, to determine the status of blocks 9, 18, 30, 41, 103 and 108, six different blocks of the block allocation bitmap must be read because no single block of the block allocation bitmap contains a status bit for more than one block to be freed. Consequently, with some storage systems, the operations required for freeing disk blocks during a transactions log replay results in multiple disk reads, where each block being read is in a different location on disk. Both the number and nature of the resulting disk reads can cause a significant delay in the completion of replaying a transactions log. Therefore, consistent with an embodiment of the invention, the operations required to free the disk blocks is delayed until after the transactions log has been replayed, the file system initialized and the storage system is ready to process client requests, Not only does this decrease perceived downtime from the perspective of clients, it increases the likelihood that a single block allocation bitmap will indicate the status of multiple blocks to be freed, thereby decreasing the total number of disk read operations required to free the disk blocks.

Figure 5:
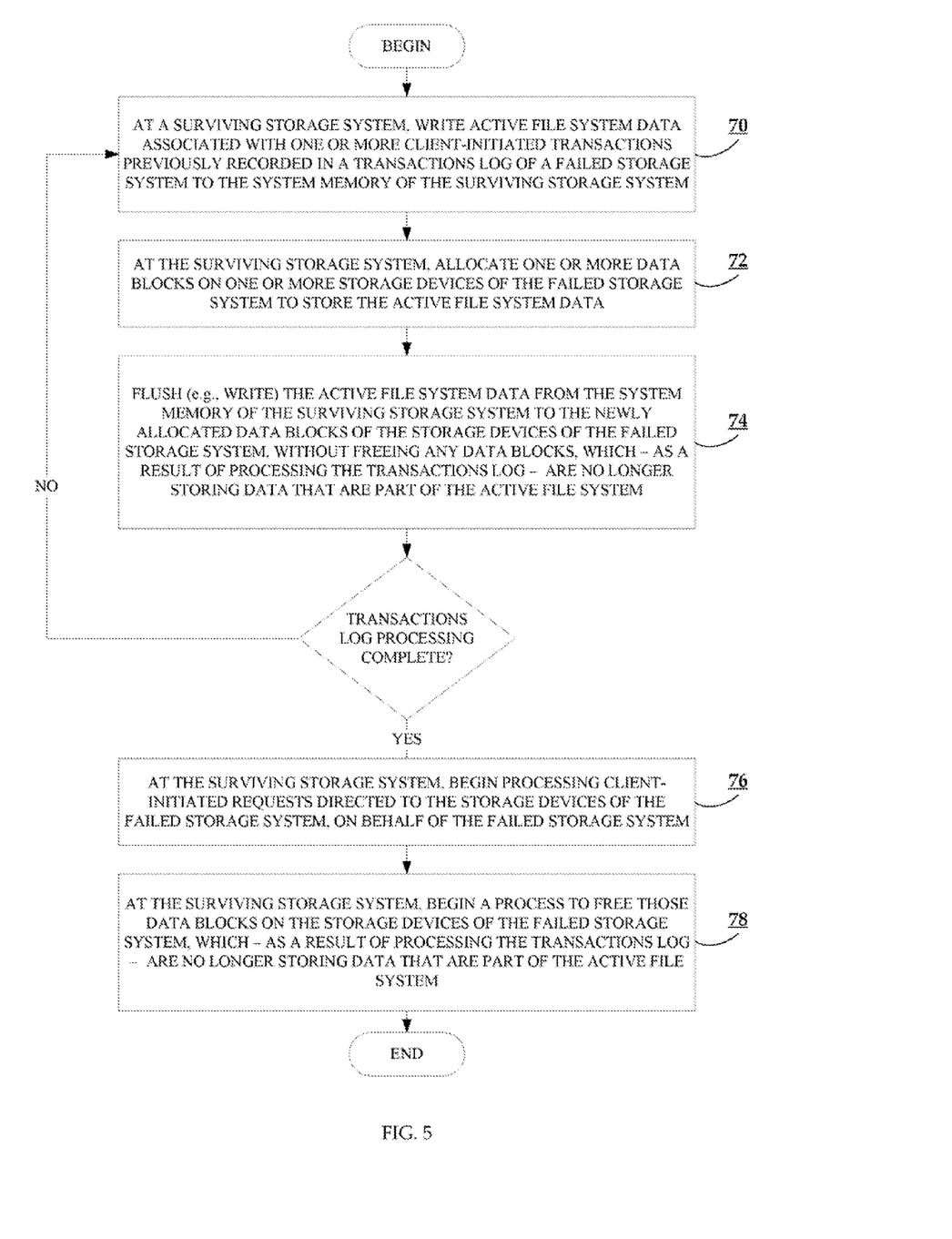
FIG. 5 illustrates a method, according to an embodiment of the invention, by which a storage system, configured to operate in a high-availability cluster, takes over for a failed storage system after a system failure event.

FIG. 5 illustrates a method, according to an embodiment of the invention, by which a storage system configured to operate in a high-availability cluster takes over for a failed storage system after a system failure event. In general, a system failure event is any error or malfunction that prevents a data storage system from operating in a normal state and/or reliably servicing client-initiated requests. By way of example, a system failure event may be caused by a storage system losing power (e.g., a power failure), a disk failure (e.g., a mechanical failure), or a network failure that isolates a storage system.

In a high-availability clustered configuration, there are a variety of mechanisms that may be used to have one storage system inform another of a system failure event. For example, in one embodiment of the invention, the storage systems may periodically communicate a "heart beat" signal to one another over a direct communication channel, such as the interconnect cable connecting the two storage systems as illustrated in FIG. 2. So long as a storage system receives the "heart beat" signal from its partner system as expected, each storage system operates in a normal state. However, the absence of such a signal may indicate that a system failure event has occurred at the partner storage system. Alternatively, one storage system may directly communicate a message to the other storage system to indicate that a system failure event has occurred. For example, in one embodiment of the invention, after a storage system detects its own system failure event, that storage system may communicate a message over a network connection, or an interconnect cable, to its partner storage system, indicating that a system failure event has occurred. In yet another embodiment, a storage location on a shared disk may be configured as a "mailbox" such that, one storage system can write a message to the mailbox to inform the other storage system of a system failure event. Accordingly, each storage system may be configured to periodically read from the designated storage location to determine if a message has been written by a partner storage system.

Referring again to FIG. 5, once the surviving storage system has determined that its partner storage system has experienced a system failure, the surviving storage system begins a takeover procedure. The takeover procedure performs the necessary operations to initialize the surviving storage system to begin processing client requests on behalf of the failed storage system. Accordingly, as part of the takeover procedure, the surviving storage system begins replaying transactions previously recorded in a non-volatile transactions log of the failed storage system. The transactions log from which the transactions are replayed may be a transactions log mirror, such as transactions log mirror A or B illustrated in FIG. 2. As part of the transactions log replay process, at method operation 70, the surviving storage system writes active file system data associated with one or more transactions in the transactions log to the system memory of the surviving storage system. This active the system data represents data that were in the system memory of the failed storage system at the time of the system failure, and therefore lost.

Next, at method operation 72, the surviving storage system allocates one or more data blocks on the storage devices of the failed storage system to store the active file system data written to system memory in method operation 70. For instance, the storage system may read a portion of a block allocation bitmap that indicates which data blocks of a storage device are free, and therefore available to store new data. As the data blocks are allocated, their status is changed in the block allocation bitmap to show that the blocks are allocated and no longer free, in other embodiments, a data structure other than a block allocation bitmap may be used to indicate the status (i.e., allocated or free) of the data blocks.

Next, at method operation 74, the surviving storage system flushes (e.g., writes) the active file system data from the system memory of the surviving storage system to the newly allocated data blocks on the storage devices of the failed storage system. Advantageously, the active file system data are written to the newly allocated data blocks without freeing any data blocks, which—as a result of processing the transactions log—are no longer storing active file system data. That is, to the extent that any file system data written to a newly allocated data blocks replaces file system data in an existing or previously allocated data block, the previously allocated data block that is being replaced is not immediately freed to be re-used by the storage system. For example, the surviving storage system does not perform any disk read or disk write operations necessary to update the data structures that indicate the status (allocated or free) of the data blocks that need to be freed as a result of processing transactions in the transactions log. This decreases the time required to complete processing of the transactions log, and ultimately decreases the time during which the surviving storage system is prevented from processing client-initiated requests on behalf of the failed storage system.

After flushing the contents of system memory to the storage devices, the surviving storage system determines whether the entire transactions log has been processed. For instance, as transactions in the transactions log are processed, the transactions are cleared or marked as processed. Only after all the transactions have been processed does the storage system begin processing client-initiated requests. Accordingly, if one or more transactions remains to be processed, the surviving storage system continues processing transactions by writing active file system data to system memory, allocating data blocks to store the active file system data, and flushing the active file system data to the newly allocated data blocks of the storage devices. In one embodiment of the invention, the transactions in the transactions log may be processed serially, one-by-one, such that the file system data associated with one transaction is written to memory and flushed to a storage device prior to the processing of the next transaction. Alternatively, multiple transactions from the transactions log may be processed together. For example, the surviving storage system may write active the system data associated with multiple transactions into system memory, and then organize the data, allocate data blocks for the data, and finally flush all the data to the allocated data blocks.

Once the transactions log processing is complete, at method operation 76 the surviving storage system begins processing client-initiated requests on behalf of the failed storage system. Specifically, the surviving storage system begins processing client-initiated requests directed to data stored on the storage devices of the failed storage system. This may be accomplished, for example, by enabling, a mechanism that forwards or redirects requests directed to the failed storage system to the surviving storage system. Alternatively, a message may be broadcast to clients of the failed storage system, indicating that the clients should direct any further requests to the surviving storage system.

Finally, after the surviving storage system has begun processing client-initiated requests, the surviving storage system begins an operation to free those data blocks on the storage devices of the failed storage system, which—as a result of processing the transaction log—are no longer storing data that is part of the active file system. For example, the surviving storage system performs the necessary disk read and disk write operations to update the data structures that indicate the status (e.g., allocated or free) of the data blocks. In various file systems, the particular data structure used for this purpose will vary. In one embodiment of the invention, the data structure may be a block allocation bitmap. Accordingly, the status of each data block on a storage device may be designated as allocated or free by setting or clearing the appropriate bit in the bitmap. Therefore, an operation to free a data block generally involves reading from a storage device the data blocks storing the appropriate portion of the allocation bitmap, setting or clearing the appropriate bit or bits associated with the data blocks to be freed, and then writing the allocation bitmap back to an appropriate data block of the storage device.

By delaying the operation to free the data blocks until after the processing of the transactions log has completed, the surviving storage system is able to more quickly complete the processing of the transactions log and begin processing client-initiated requests on behalf of the failed storage system. When the blocks to be freed are randomly located on the storage devices, the location of the portions of data structure indicating the status of the blocks to be freed tends to be similarly, randomly located. For instance, in the case of an allocation bitmap, the bits indicating the status of the blocks to be freed after replaying the transactions log may be randomly located throughout the allocation bitmap. Consequently, multiple data blocks comprising the allocation bitmap must be read in order to free each data block. Therefore, the performance gain realized by delaying the operation to free data blocks is significant for those file systems, such as the WAFL® file system, which tend to leave data blocks randomly located on storage devices in need of being freed.

Figure 6:
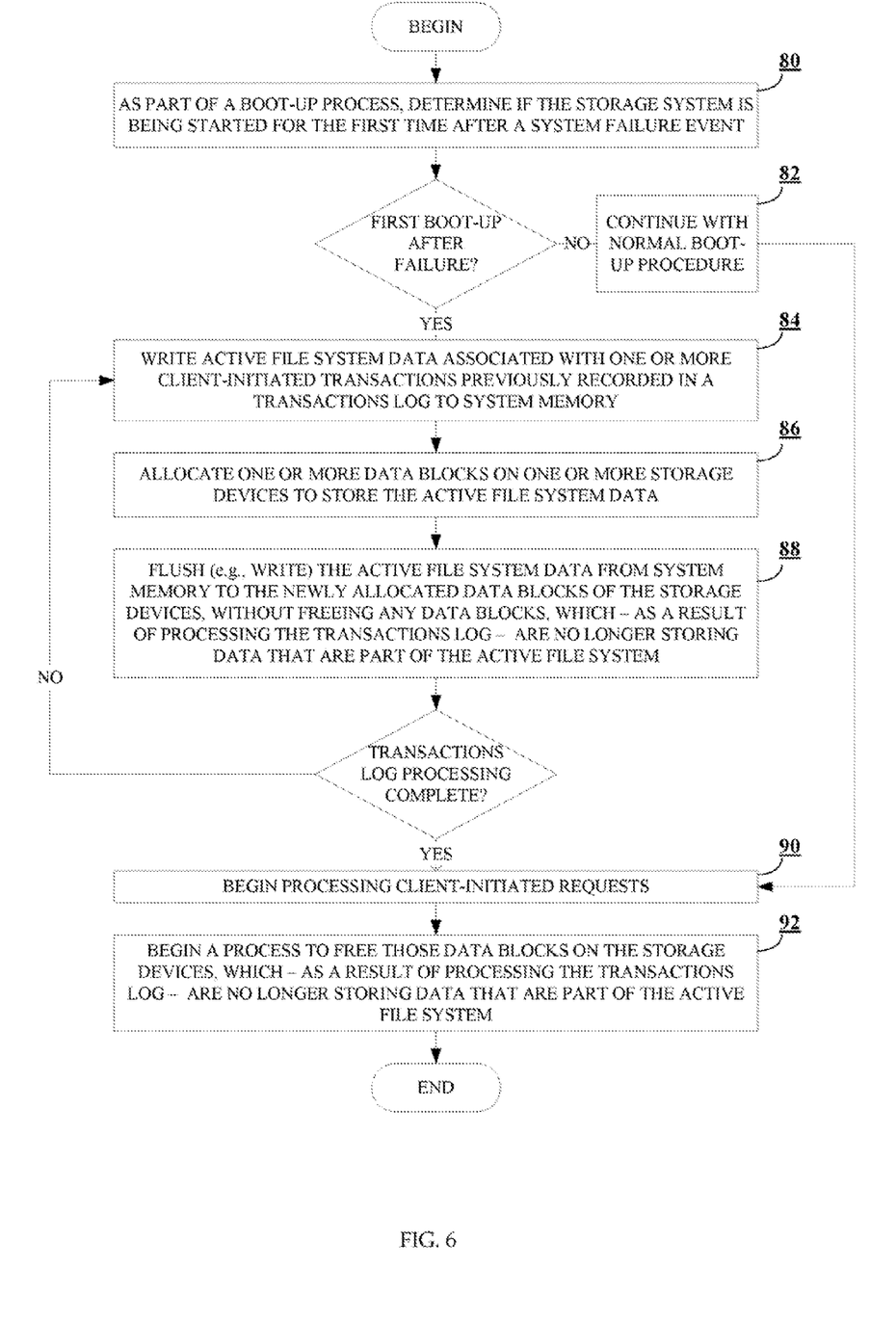
FIG. 6 illustrates a method, according to an embodiment of the invention, by which a stand-alone storage system recovers from a system failure event.

FIG. 6 illustrates a method, according to an embodiment of the invention, by which a stand-alone storage system recovers from a system failure event. As illustrated in FIG. 6, the method begins at method operation 80 when, as part of the boot-up process, the storage system determines whether the storage system is being booted-up for the first time since a system failure event occurred. For instance, as part of the boot-up process, the storage system verifies that it was last shut down under normal operating conditions if so, the storage system proceeds to boot as normal (e.g., as illustrated at method operation 82). However, if the storage system is booting for the first time after a system failure event, a recovery procedure is executed to ensure that any active file system data that may have been in system memory (and not yet committed to disk storage) at the time of the system failure event is recovered and flushed to the storage devices prior to processing client requests. This prevents corruption of the file system. For example, in one embodiment of the invention, when a system failure event occurs, the storage system will write an error message to a predetermined memory location (e.g., a particular location on disk, or some other non-volatile memory) indicating that the storage system shut down outside of normal operating conditions. Upon booting, the storage system will read from the predetermined memory location and verify that the last shut down was a normal shutdown, if the memory location has been written with an error message, the storage system will execute the recovery routine to ensure that no data was lost during the system failure event and abnormal shutdown.

Accordingly, if the storage system is hooting-up for the first time after a system failure event, then at method operation 84, the storage system processes transactions in the non-volatile transactions log. The non-volatile transactions log stores transactions (e.g., client-initiated write commands) that were processed by the storage system, but were not flushed to storage devices. Therefore, any active file system data stored in memory at the time of the system failure—and therefore lost—can be restored by processing the transactions log. In one embodiment of the invention, processing a transaction involves first writing the data associated with the transaction to system memory. Then, at method operation 86, the storage system allocates one or more data blocks of a storage device to store the file system data written to system memory at method operation 84. At method operation 88, the file system data is flushed (e.g. written) to the newly allocated data blocks of the storage device. This may be done serially on a one-by-one basis, such that the data associated with one transaction is written to a data storage device prior to processing the next transaction. Alternatively, transactions in the transactions log may be processed in a group, such that the data from several transactions may be processed into memory, and then flushed to newly allocated data blocks in a single disk write operation. In either case, the file system data is written to the newly allocated data blocks of the storage devices without freeing any data blocks, which—as a result of processing the transactions log—are no longer storing data that is part of the active file system. This decreases the time required to complete the replay process, which shortens the time required for file system initialization and boot-up.

After the transactions log has been processed completely, at method operation 90 the replay and hoot-up processes are completed, and the storage system begins processing client-initiated requests. Only after the storage system has begun processing client-initiated requests does the storage system begin processing the back log of operations required to free the data blocks that are no longer needed. For instance, at method operation 92, the storage system begins an operation to free those data blocks that are no longer part of the active file system as a result of processing transactions in the transactions log during boot-up. As described above, the operation to free the data blocks involves modifying the data structure used by the particular file system to indicate the status of the data blocks.

In one embodiment of the invention, the storage system may optimize the procedure for freeing the data blocks by combining, what would be multiple disk read operations into one disk read operation. For example, after completing the replay of the transactions log, the storage system may analyze the location of the portions of the data structure that must be read in order to change the status of the data blocks that need to be freed. Accordingly, if multiple portions of the data structure can be read with one disk read operation, then one disk read operation is performed to read the multiple data blocks containing the multiple portions of the data structure necessary for freeing the data blocks.

In one embodiment of the invention, the methods described herein may be embodied as a sequence or series of instructions stored on a computer- or machine-readable medium. While the machine-readable medium may be a single medium, the term "machine-readable medium" should be taken to include a single medium or multiple media (e.g., memory or storage components) that store the one or more sets of instructions. The term "machine-readable medium" shall also be taken to include any medium that is capable of storing, encoding or carrying a set of instructions for executing by the machine and that cause the machine to perform any one or more of the methodologies of the present invention. The term "machine-readable medium" shall accordingly be taken to include, but not be limited to, solid-state memories, optical and magnetic media, and carrier wave signals. Finally, the illustrative method operations, which may be performed by a computer-implemented program (e.g., instructions), may be executed simultaneously, or in a different order than described above, and additional processing steps may be incorporated. Furthermore, various aspects of the invention may be implemented in hardware, software, or a combination thereof.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. In general, the scope of the invention is defined by the claims and their equivalents.

The invention claimed is:

1. At a storage system, a method to recover from a system failure, comprising:
   during a file system initialization process, processing client-initiated transactions stored in a non-volatile transactions log so as to write to system memory active file system data lost during the system failure;
   allocating, and writing the active file system data to, data blocks of one or more storage devices without freeing data blocks storing data no longer part of the active file system as a result of processing a client-initiated transaction stored in the non-volatile transactions log; and
   freeing those data blocks storing data no longer part of the active file system as a result of processing a client-initiated transaction stored in the non-volatile transactions log after the file system initialization process has completed and the storage system has begun processing client-initiated requests.

2. The method of claim 1, wherein the active file system data lost during the system failure comprises file system data stored in system memory and not yet written to a storage device.

3. The method of claim 1, wherein the file system initialization process occurs during a first boot-up sequence after the system failure.

4. The method of claim 1 performed on a non-failed storage system that is operably coupled with the storage system that experienced the system failure.

5. The method of claim 1, wherein freeing those data blocks of the storage device storing data no longer part of the active file system comprises updating a file system data structure used for indicating the status of data blocks of the one or more storage devices to indicate that the data blocks storing data no longer part of the active file system are free.

6. The method of claim 5, wherein updating a file system data structure used for indicating the status of data blocks of the one or more storage devices comprises reading multiple portions of said data structure using a single disk read, where respective portions of the multiple portions of said data structure are necessary for freeing a data block.

7. A method to takeover for a failed storage system after a system failure, the method comprising:
   a surviving storage system that did not fail, processing, during an initialization process, client-initiated transactions stored in a non-volatile transactions log of the failed storage system so as to write to system memory of the surviving storage system active file system data lost at the failed storage system during the system failure;
   the surviving storage system, allocating, and writing the active file system data to, data blocks of a storage device of the failed storage system without freeing data blocks of the storage device of the failed storage system, which are storing data no longer part of the active file system as a result of processing a client-initiated transaction stored in the non-volatile transactions log of the failed storage system; and
   freeing those data blocks of the storage device of the failed storage system, which are storing data no longer part of the active file system as a result of processing a client-initiated transaction stored in the non-volatile transactions log of the failed storage system after the file system initialization process has completed and the surviving storage system has begun processing client-initiated requests on behalf of the failed storage system.

8. The method of claim 7, wherein the non-volatile transactions log of the failed storage system comprises a transactions log mirror maintained at the surviving storage system.

9. The method of claim 7, wherein the active file system data lost during the system failure comprises file system data stored in system memory of the failed storage system and not yet written to a storage device of the failed storage system.

10. The method of claim 7, wherein the file system initialization process occurs during a first boot-up sequence after the system failure.

11. The method of claim 7, wherein freeing those data blocks of the storage device of the failed storage system, which are storing data no longer part of the active file system as a result of processing a client-initiated transaction stored in the non-volatile transactions log of the failed storage system comprises optimizing a storage device read operation to read a number of data blocks which minimizes the total number of storage device read operations required to free the data blocks of the storage device of the failed storage system, which are storing data no longer part of the active file system as a result of processing a client-initiated transaction stored in the non-volatile transactions log of the failed storage system.

12. A system for recovering from a data storage system failure, comprising:
   non-volatile memory configured to store a non-volatile transactions log that comprises client-initiated transactions stored prior to the data storage system failure;
   a transactions processor operably linked with the non-volatile memory, and configured to process the client-initiated transactions stored in the non-volatile transactions log during a file system initialization process, the processing comprising writing to system memory active file system data that was not processed during a system failure;
   an allocation component operably coupled with the system memory, and configured to allocate data blocks of one or more storage devices, for the active file system data, without freeing data blocks storing data no longer part of the active file system;

a data writing component operably coupled with the system memory, and configured to write the active file system data to the allocated data blocks; and a data block freeing component operably coupled with the system memory, and configured to free the data blocks storing data no longer part of the active file system, as a result of the transaction processor processing the client-initiated transactions stored in the non-volatile transactions log, upon completion of the file system initialization process and upon the storage system beginning processing of client-initiated requests.

13. The system of claim 12, wherein the active file system data that was not processed during the system failure comprises file system data stored in the system memory and not yet written to the one or more storage devices.

14. The system of claim 12, wherein the file system initialization process occurs during a first boot-up sequence after the system failure.

15. The system of claim 12, disposed on a non-failed storage system that is operably coupled with the storage system that experienced the system failure.

16. The system of claim 12, comprising a data structure updating component operably coupled with the data block freeing component, and configured to update a file system data structure used for indicating a status of data blocks of the one or more storage devices to indicate that the data blocks storing data no longer part of the active file system are free.

17. The system of claim 16, comprising a data structure reading component operably coupled with the data block freeing component, and configured to, during an operation to free data blocks, read multiple portions of said data structure using a single disk read, where respective portions of the multiple portions of said data structure are necessary for freeing a data block.

18. A system for taking over for a failed data storage system, comprising:

a partner storage system operably linked to the failed data storage system, comprising:

non-volatile memory configured to store a non-volatile transactions log that comprises client-initiated transactions from the failed data storage system stored prior to the data storage system failure;

a transactions processor operably linked with the non-volatile memory, and configured to process the client-initiated transactions from the failed data storage system stored in the non-volatile transactions log, the processing comprising writing to the partner storage system's memory active system data that was not processed by the failed data storage system;

an allocation component operably coupled with the partner storage system's memory, and configured to allocate data blocks of one or more storage devices from the failed data storage system, for the active system data, without freeing data blocks storing data no longer part of the active system;

a data writing component operably coupled with the partner storage system's memory, and configured to write the active system data to the allocated data blocks in the failed data storage system; and a data block freeing component operably coupled with the partner storage system's memory, and configured to free the data blocks of the one or more storage devices of the failed data storage system, which are storing data no longer part of the active system, as a result of the transaction processor processing the client-initiated transactions stored in the non-volatile transactions log of the failed data storage system, upon completion of a system initialization process and upon the partner data storage system beginning processing of client-initiated requests on behalf of the failed data storage system.

19. The system of claim 18, wherein the non-volatile transactions log of the failed data storage system comprises a transactions log mirror maintained in the non-volatile memory of the partner storage system.

20. The system of claim 18, wherein the active system data that was not processed by the failed data storage system comprises system data stored in system memory of the failed data storage system and not yet written to the one or more storage devices of the failed data storage system.

21. The storage system of claim 18, wherein the system initialization process occurs during a first boot-up sequence after the system failure.

22. The system of claim 18, comprising a storage device read optimization component configured to optimize a storage device read operation to read a number of data blocks which minimizes the total number of storage device read operations required to free the data blocks of the storage device of the failed storage system, which are storing data no longer part of the active system as a result of processing a client-initiated transaction stored in the non-volatile transactions log of the failed storage system.

* * * * *